United States Patent

[11] 3,570,654

| [72] | Inventor | Alan Harvey Hill<br>Darlington, England |
|---|---|---|
| [21] | Appl. No. | 808,214 |
| [22] | Filed | Mar. 18, 1969 |
| [45] | Patented | Mar. 16, 1971 |
| [73] | Assignee | General Engineering Company (Radcliffe) Limited |
| [32] | Priority | Mar. 21, 1968 |
| [33] | | Great Britain |
| [31] | | 13,657 |

[54] CONVEYING SCREW FOR EXTRUSION MACHINES AND THE LIKE
6 Claims, 11 Drawing Figs.

[52] U.S. Cl. .................................................. 198/213, 259/9
[51] Int. Cl. ..................................................... B65g 33/08
[50] Field of Search ........................................... 198/213, 64; 259/9, 10, 142, 109, 110

[56] References Cited
UNITED STATES PATENTS

| 662,173 | 11/1900 | McGrath ...................... | 198/213 |
| 1,521,044 | 12/1924 | Parker ........................... | (198/213) |
| 2,754,542 | 7/1956 | Henning et al. ................ | (259/9) |
| 3,164,375 | 1/1965 | Frenkel ......................... | 259/9X |
| 3,169,752 | 2/1965 | DeLaubarede ............... | 259/9X |
| 3,253,892 | 5/1966 | Brignac et al. ................ | 259/97X |

*Primary Examiner*—Albert J. Makay
*Attorneys*—Harry C. Bierman, Jordan B. Bierman and Bierman and Bierman ABSTRACT: Screw conveyors for extrusion machines, and more particularly a conveying screw of the kind adapted to be rotated in a barrel of circular cross section and comprising a central core having at least two spiral flights thereon to form a multistart thread over at least part of its length, adjacent flights defining channels therebetween down which the material to be extruded is progressed.

PATENTED MAR 16 1971
3,570,654
SHEET 1 OF 3
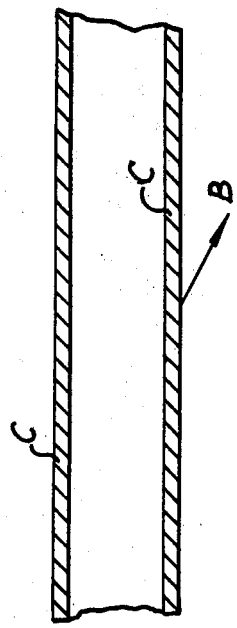
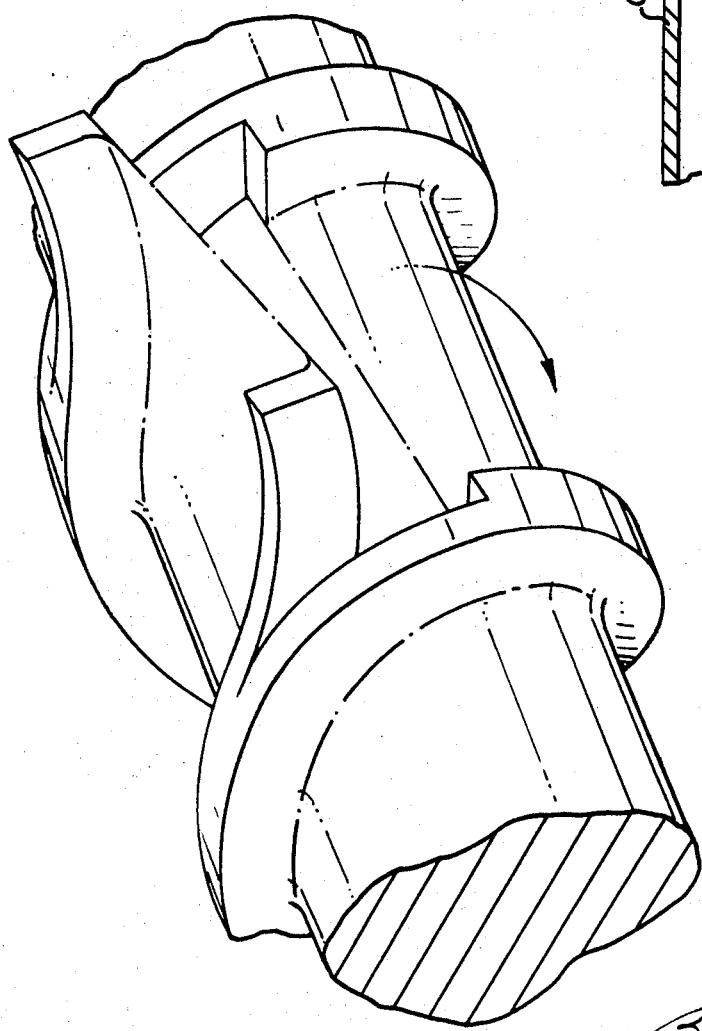
INVENTOR:
ALAN HARVEY HILL
BY
Bierman & Bierman
ATTORNEYS PATENTED MAR 16 1971
3,570,654
SHEET 2 OF 3
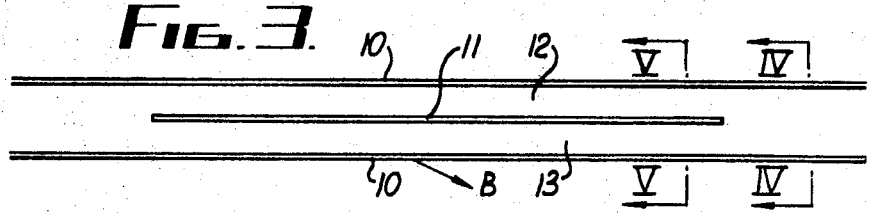
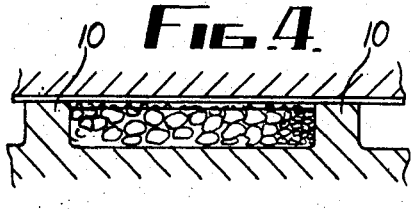 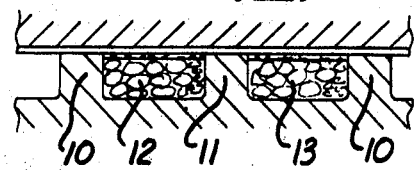
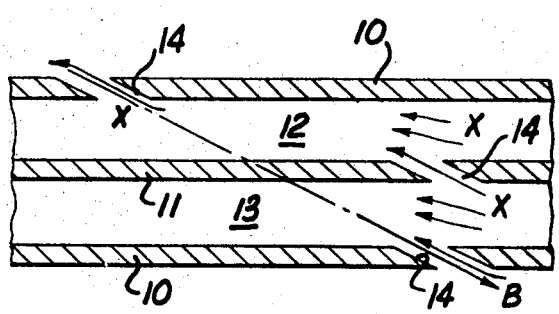
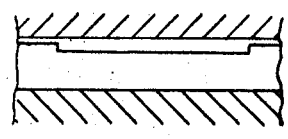
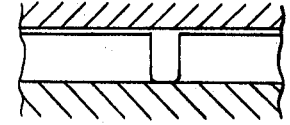
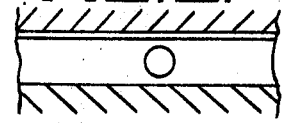
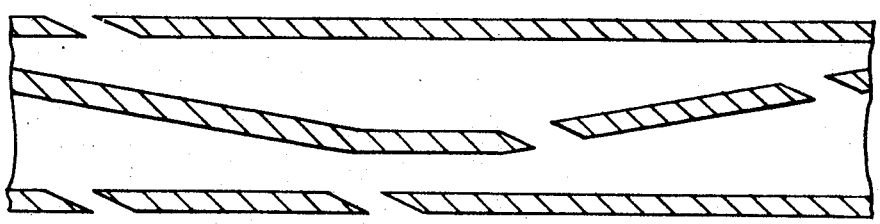
INVENTOR:
ALAN HARVEY HILL
BY
Bierman & Bierman
ATTORNEYS

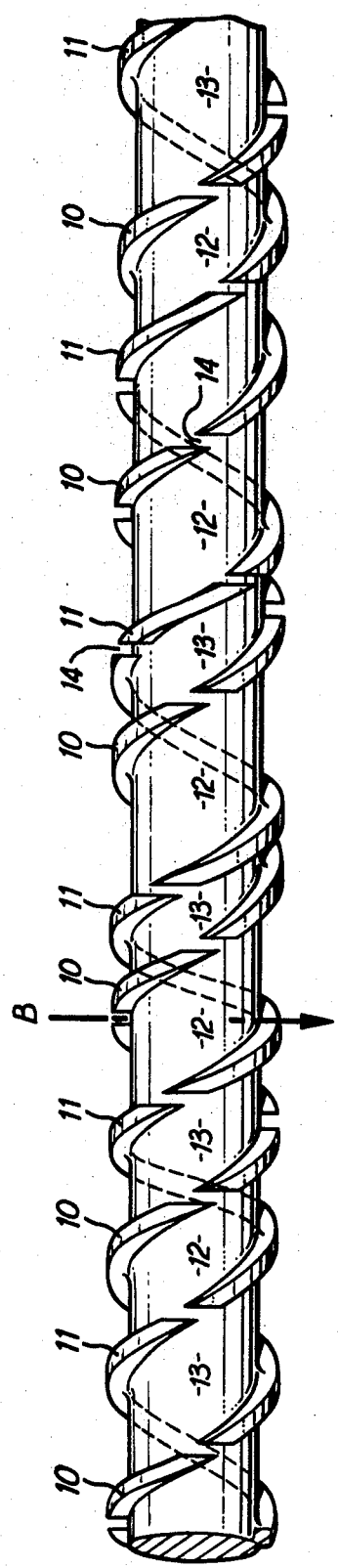

CONVEYING SCREW FOR EXTRUSION MACHINES AND THE LIKE

In the extrusion of plastics and similar materials it is desirable that the viscoelastic properties of the material should be constant so that it can be shaped (in the die and afterwards) into the desired profile consistently. The shearing of the material in the extruder changes its viscoelastic properties by partially orienting the molecules. For uniform viscoelastic properties it is as desirable, therefore, that all the particles in the extruder should be sheared to the same degree as it is that they should be uniformly heated. In practice conventional screw extruders tend to fail in these objectives. The material heated to the plastic state against the barrel wall accumulates against the leading faces of the flights. In the conventional screw extruder there is a tendency for this softer material to remain adjacent to the leading face of the flight also some particles do not become softened to the same degree as the bulk of the material surrounding them.

It is desirable, therefore, to reduce the size and number of hard particles and to distribute the "hard" and "soft" material as uniformly as possible in the screw channel.

According to the present invention a conveying screw of the kind referred to is characterized by the provision of apertures through the flights at such locations that there are no apertures opposite one another in the direction of motion of the screw on adjacent flights, whereby the material being conveyed in each channel is allowed to migrate into an adjacent channel.

In accordance with a particular embodiment of the invention the areas of cross section of the channels are varied along their lengths in such a manner as to encourage the migration aforesaid.

The invention will be further apparent from the following description with reference to the several FIGS. of the accompanying drawings which show by way of example only a number of kinds of conveying screws embodying the invention.

FIGS. 1 and 2 of the drawings are not relevant to the description of the invention but serve to illustrate the method by which drawings being flat-plate analogies of a conveying screw are obtained, such drawings being utilized for clarity in the following description.

Of the drawings:

FIG. 1 shows a perspective view of a conveying screw having one flight with the channel so formed being "unwound" therefrom;

FIG. 2 shows the "unwound" channel laid out in a straight line to give the flat-plate analogy aforesaid;

FIG. 3 shows a flat-plate analogy of a conveying screw having a first flight extending between its extreme ends, and a second flight extending over an intermediate length;

FIGS. 4 and 5 are cross sections on the lines IV—IV and V—V of FIG. 3 respectively;

FIG. 6 shows a flat-plate analogy of a portion of one form of conveying screw embodying the invention;

FIGS. 7, 8 and 9 show elevations of the flights of FIG. 6 illustrating different forms of aperture which might be used;

FIG. 10 shows a flat-plate analogy of a portion of a second form of conveying screw embodying the invention; and FIG. 11 is a view similar to that of FIG. 1 showing a form of the device which combines the embodiments of FIGS. 8 and 10.

FIGS. 1 and 2 are self-explanatory but it should be noted that when the screw is rotated in the direction of the arrow A (FIG. 1) the channel is moving in the direction of the arrow B (FIG. 2) relative to the barrel wall, and that the shaded areas C represent opposite sides of the single flight at one position thereon.

Referring now to FIG. 3 it will be seen that the conveying screw has a first flight 10 extending between its extreme ends and that it is provided with a second flight 11 defining two adjacent parallel channels 12 and 13 over an intermediate portion of the length of the conveying screw.

FIGS. 4 and 5 illustrate the effect described above whereby the viscous or soft phase accumulates against the leading faces of the flights 10 and 11.

As we have seen it is an object of the invention to promote migration of the material between the adjacent channels 12 and 13 to homogenize the material.

Thus as can be seen in FIG. 6 apertures 14 are provided in flights 10 and 11 to allow material to flow between the adjacent channels 12 and 13 in the direction of the arrows X. These apertures 14 may take many different forms such as shallow elongated slots (FIG. 7), deep narrow slots (FIG. 8) or orifices (FIG. 9). As clearly shown in FIG. 6 the apertures 14 are arranged in such a manner that there are no two opposite one another in the direction of motion relative to the wall of the barrel on adjacent flights 10 and 11.

If desired the migration of material through the apertures can be encouraged by varying the areas of cross section of the adjacent channels, in the vicinity of each aperture or group thereof.

This is conveniently achieved by varying the channel widths by changing the pitch of one or more of the flights (see FIG. 10).

Alternatively, the depths of the channels may be varied, or both the widths and the depths may be varied together.

It will be appreciated that it is not intended to limit the invention to the above example only many variations such as might readily occur to one skilled in the art being possible without departing from the scope thereof.

I claim:

1. A conveying screw comprising a central core having at least two spiral flights thereon to form a multistart thread over at least part of its length, adjacent flights defining channels therebetween down which material to be extruded is progressed characterized by the provision of apertures through each of said flights at locations such that there are no apertures opposite one another on adjacent flights in the direction of motion of the screw, whereby said material in each channel is allowed to migrate into an adjacent channel.

2. A conveying screw according to claim 1 in which areas of cross section of the channels are varied along their lengths whereby said migration is encouraged.

3. A conveying screw according to claim 1 in which the cross section of the channels is varied by reducing the depth of the channels along their length.

4. A conveying screw according to claim 1 in which the apertures are constituted by a relieved area on the outermost face of at least one of the flights.

5. A screw according to claim 1 wherein the apertures are constituted by a slot in at least one of said flights, said slot extending over substantially the full depth of the flight.

6. A screw according to claim 1 wherein the apertures are constituted by a hole through at least one of said flights.